Sept. 23, 1941.  E. S. CORNELL, JR  2,256,879
WELDING DEVICE
Filed Dec. 2, 1938  3 Sheets-Sheet 3
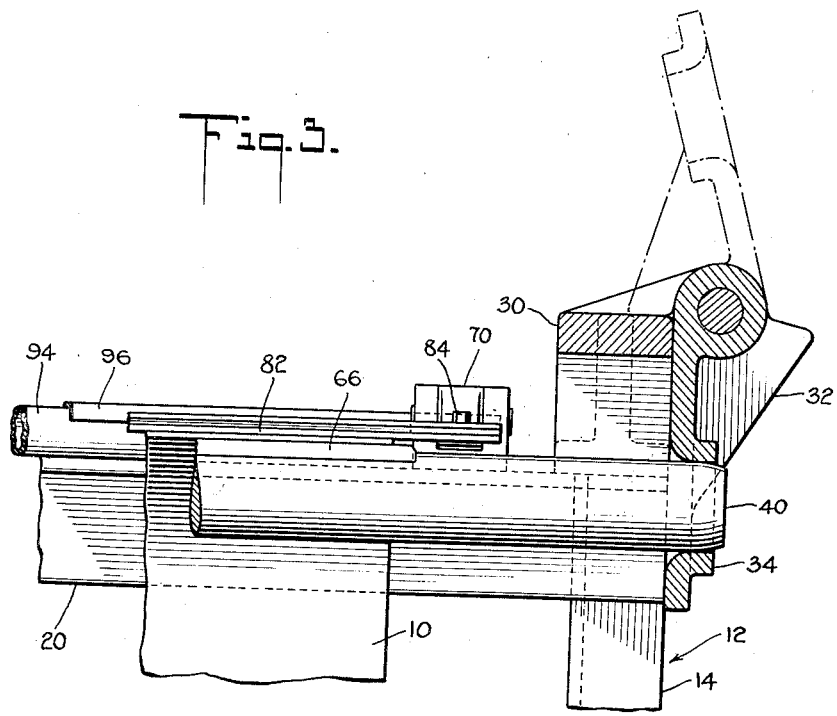
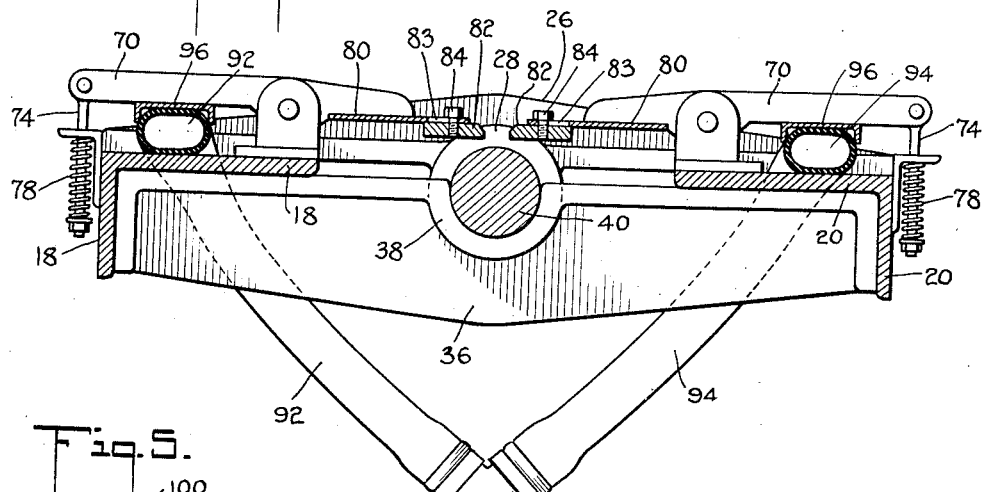
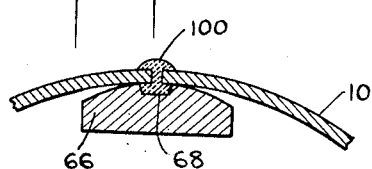
INVENTOR
Edward S. Cornell, Jr.
BY
HIS ATTORNEY Patented Sept. 23, 1941

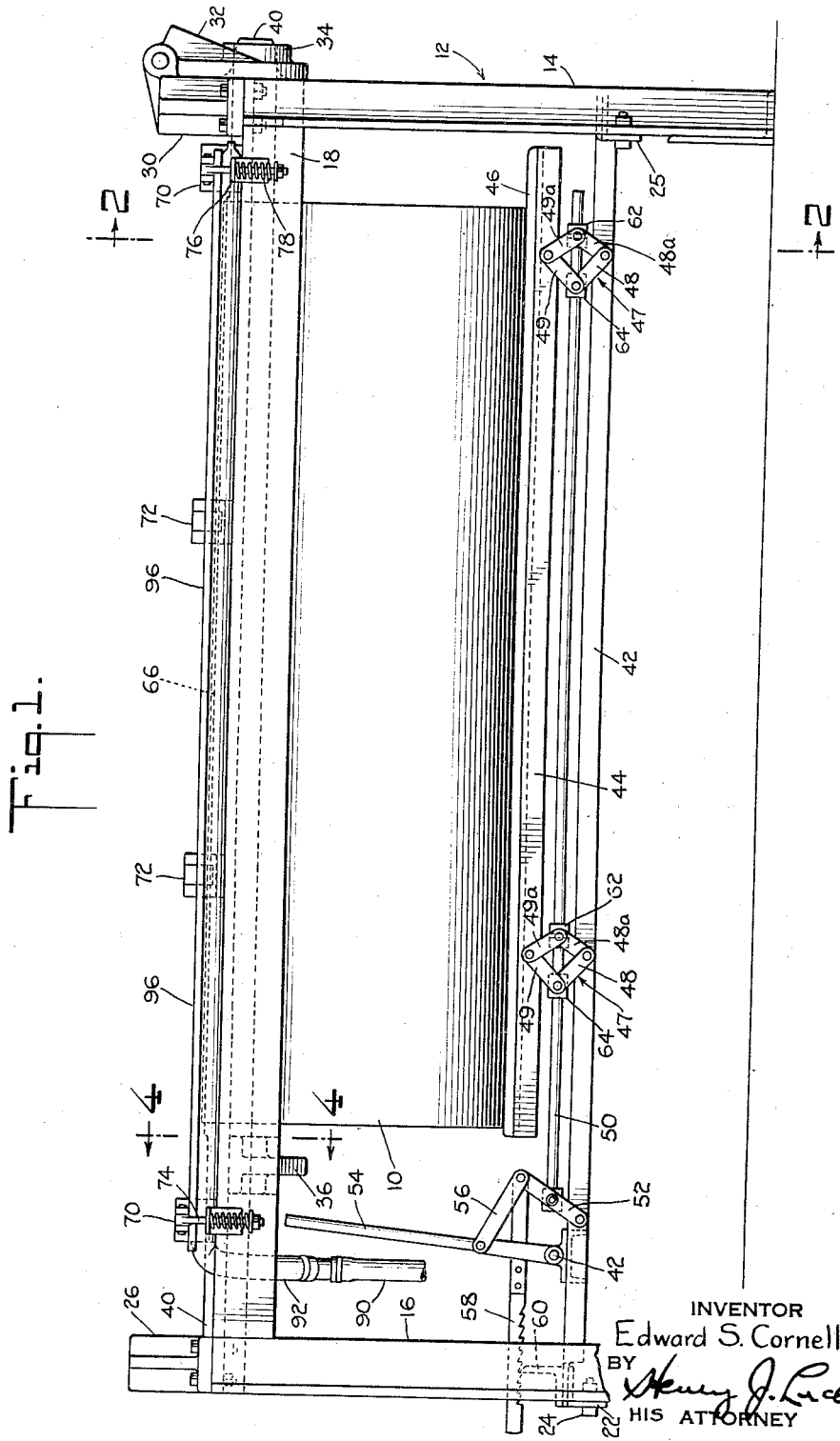

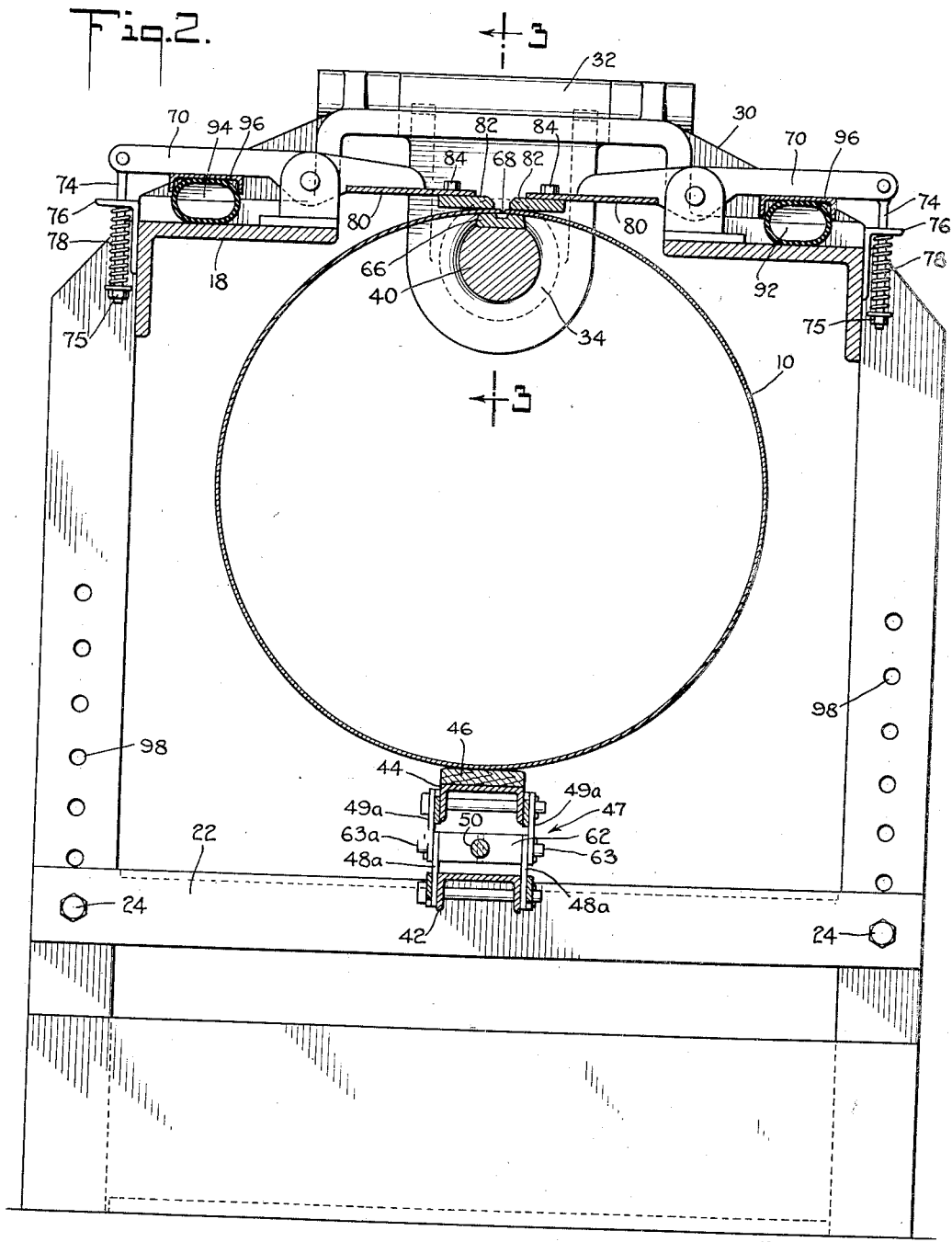

2,256,879

UNITED STATES PATENT OFFICE 2,256,879

WELDING DEVICE

Edward S. Cornell, Jr., Larchmont, N. Y.

Application December 2, 1938, Serial No. 243,486

2 Claims. (Cl. 113—59)

The present invention relates to improved work-holding devices, for welding operations or the like.

It is an object of the present invention to provide an improved welding device, by means of which an object to be welded may be conveniently positioned for the operator, and supported in a manner which fixedly positions the to-be-welded portions thereof in their proper relative positions, thus facilitating the welding operation, and affording uniformity of weld-metal deposit.

It is a further object of the invention to provide matrix means whereby the welded joints may have a substantially uniform and pre-established amount of weld-metal deposit, thereby insuring an adequate factor of safety of the strength of the welded joint.

Further, it is an object of the invention to provide means affording the rapid conduction or transfer of heat to prevent the weld material from adhering to the matrix establishing the ultimate configuration and amount of the welding, i. e., bonding, material.

Further, it is an object of the invention to provide an improved welding device in which the to-be-welded portions of a structure are suitably and fixedly supported against any tendency to separate by reason of the weight of the portions, inherent springable characteristic of the metal, or like cause.

The present invention is applicable, for example, to the making of longitudinal body seam welds in pressure vessels, such as water storage tanks or the like, in which the strength of the welded joint must afford an adequate, and desirably uniform, safety factor, and in which it may be desirable that the configuration of the weld internally of the tank structure have a substantially uniform configuration, free from pockets or the like, and thus adaptable to complete scouring or other sanitary treatment.

A feature of the invention, therefore, lies in means for adequately supporting work upon which a weld is to be made, and for providing welded joints having a substantially uniform configuration and a strength safety factor which is substantially uniform throughout the length of the weld.

Other features and advantages will hereinafter appear.

In the accompanying drawings:

Fig. 1 is a side elevation of a welding device made pursuant to the present invention;

Fig. 2 is a sectional elevation, taken on the lines 2—2 of Fig. 1, illustrating the clamp means and the welding matrix means;

Fig. 3 is a detail sectional elevation illustrating a method of mounting the work-supporting mandrel at an end thereof;

Fig. 4 is a sectional elevation taken on the lines 4—4 of Fig. 1 and illustrating, in detail, the work-clamping members and the actuating means therefor; and Fig. 5 is a fragmentary sectional view of a structure welded pursuant to the present invention, said view being prior to the removal of the structure from the welding device, and illustrating a representative configuration given to the welded joint internally of the structure, by the matrix bar.

Referring to the drawings, the "work" is shown as a cylindrical tank, abutting edges of which are to be joined by a butt weld to form a longitudinal body seam.

In accordance with the present invention, my improved welding device 12 supports the work 10 in a manner which maintains the edges in fixed alignment, and in a position convenient to the welder. Additionally, cylindrical or circular work forms are maintained in substantially true cylindrical status during the welding process.

The improved welding device includes a frame work of suitable height, which may be formed from any suitable standard structural elements. End supporting frames 14, 16, combine with longitudinal angle members 18, 20, and adjustably positioned front and rear cross pieces 22, 24 in forming the basic work-supporting frame work. At the upper portion of one of the end structures, as 16, there may be provided a yoke 26, suitably secured thereto, and having a boss 28, provided with a suitable opening. At the opposite end, a yoke 30 may be provided with a pivotally mounted gate 32, the latter having a suitable boss 34 arranged in alignment with the boss 28. Intermediate the end frame structures, and preferably disposed suitably adjacent the yoke 26, there is provided a hanger 36, suitably secured, as by bolting or equivalent, to the side channels 18, 20. Hanger 36 may have a central cradle 38, disposed in alignment with the bosses 28, 34, respectively of the yoke 26 and gate 32.

Such yoke and hanger arrangement affords means whereby mandrel 40 may be supported by the frame, said mandrel desirably being a metal bar of suitable strength for supporting the work without bending or other unwanted deformation. The mandrel may be slidably inserted into the stated yokes, and may be suitably secured, as by a set screw or equivalent, to the boss 28 of the rear yoke 26. The mandrel may be grounded, if electrical welding processes are to be employed.

As shown in Fig. 3, the pivotally mounted gate 32 may be swung upwardly away from the mandrel 40, thus clearing the structure for the insertion or removal of the work 10. It will be understood that when the gate 32 is in raised position, the mandrel 40 is adequately supported by the rear yoke 26 and the intermediate hanger 36.

To facilitate the engagement of the aperture of the boss 34 with the end of the mandrel 40, and to insure that the mandrel 40 is in desired horizontal alignment, the end of the mandrel may be suitably tapered, as shown, to cooperate with an equivalently tapered formation of the boss 34.

An additional work-supporting element of the welding device consists of a longitudinal structural member 42, which is preferably affixed to the respective cross pieces 22, 24, in a manner insuring substantial parallelism with the mandrel 40. Member 42 carries, in a manner providing for adjustable positioning, a longitudinal rail 44, said element, as shown in Fig. 1, being of any suitable length, but preferably longer than the work 10. Such rail 44 is desirably surfaced with a suitable sill 46 of hardwood or the like, the said sill being the member in actual contact with the work 10 during the operation thereon. For adjustably securing the rail 44, it is preferred to employ any suitable plurality of linkages 47, 47, desirably in the form of a quadric chain and so arranged that suitable movement of such linkages causes an upward or downward movement of the rail 44, always in parallel relationship to the member 42 and to the mandrel 40.

Of such links 47, the lower links 48, 48a, thereof are pivotally secured to the member 42, see Fig. 2, and the upper links 49, 49a, are pivotally secured to the rail 44, which, as shown, may be an inverted channel, the flange portions thereof affording the pivotal securement. For actuation of the links 47 to afford the desired movement of the rail 44, it is preferred to employ a bar 50. On such bar 50, and arranged to be the point of pivotal connection of the lower and upper links 48a and 49a, there is fixedly secured, as by a through pin, the collar 62, see Fig. 2, suitable end portions 63, 63a, of such collar serving as the pivot points. The links 48, 49, of each of the linkages 47 are pivotally interconnected by means of a similar collar 64, the collars 64, however, being freely slidable on the bar 50. As shown in Fig. 1, it is desirable that the links 48, 49, of each of the linkages 47 be longer than the links 48a, 49a, thereof, to preclude interference of the said links or their associated collars during movement of rail 44.

Actuating bar 50 is arranged for movement in a rearward or forward direction by means of an organization including a lever 52 and a hand lever 54, each of said levers being pivoted to member 42, and operatively associated by a link 56. As shown in Fig. 1, bar 50 is pivoted to lever 52, the point of its connection with said lever affording a radius of swing equal to that of links 48a. Accidental displacement of lever 54 in a direction clockwise of Fig. 1 may be precluded by means such as the toothed bar 58 pivotally mounted at the common pivotal connection of lever 52 and link 56. As shown, a detent 60 is provided; the disposition and slope of the teeth precludes accidental movement of the bar 58 in a direction to the right of Fig. 1, while permitting the operator to move the lever 54 counter-clockwise of Fig. 1. It will be understood that the bar 58 may be manually raised to free the detent teeth, when desired.

The mandrel 40 is provided, at its upper surface, with a matrix bar 66, the length of said bar being as desired, but preferably suitably longer than the greatest length of work for which it is to be used. Said bar 66 may be removably secured to the mandrel 40, as by suitable countersunk machine screws (not shown) or equivalent. The upper surface of matrix bar 66 is in parallelism with the horizontal plane of mandrel 40. Said bar 66 is provided with a central longitudinally disposed matrix 68, of suitable shape, but preferably, as indicated in Figs. 2 and 5, having upwardly divergent walls. Such formation gives to the completed weld a uniform and readily cleanable configuration, and affords the ready removal of the welded structure from the welding device. The matrix bar 66 is advantageously formed of "buss-bar" copper, the rapid conduction of heat in such copper matrix bar precluding the accidental "welding" of the weld metal to the matrix. The cross sectional area of the matrix 68 may be as desired, such cross sectional area regulating the internal configuration and quantity of weld metal forming the butt joint, and hence affecting the strength safety factor of the final joint.

To clamp the edge portions of the work in proper spacial alignment, and to hold such edge portions firmly against the upper surface of the matrix bar 66 and in proper position for welding, I provide a suitable plurality of pivotally mounted clamping structures, preferably arranged along each side of the welding device. As shown in Fig. 1, there may be four such pivotally mounted clamps for cooperation with each side portion of the work 10. Such clamps desirably include rocker arms 70, 72, see Figs. 1 and 2, pivotally supported on the longitudinally extending angle members 18, 20. The rocker arms 70, disposed at the ends of the welding device may be provided with pivotal links 74, which links pass through suitable supporting elements 76, and mount coil springs 78, or equivalent. The coil springs operate to urge the links 74 downwardly, thus tending to move the inner end portions of the rocker arms upwardly. The links may be provided with nuts 75, to afford adjustment of the tension of the springs. Secured to the inner end portions of the arms 70, 72, I provide a preferably continuous longitudinal web 80, said web integrating the plurality of rocker arms at either side of the welding device into a unit movable toward or away from the work 10. Adjustably secured to such webs 80, at the inner end portions thereof, are longitudinally extending clamp heads 82, 82, also desirably of buss-bar copper and suitably configurated at the inner edges to afford the ready flow of molten weld metal between the edge portions of the work 10 and into the matrix 68. Desirably, the spacing between the inner edges of such clamp elements 82 is adjustable; such adjustment may be effected by securing the said clamp elements to the webs 80 by machine screws 84, said machine screws passing through suitable slotted openings 83 in the webs 80, as shown in Fig. 4. Such adjustment is preferably within a range of from one-eighth of an inch to one inch spacing.

To move the clamp heads into engagement with the side portions of the work 10, I prefer to use hydraulic means, such as illustrated in Figs. 2 and 4. To this end, a connection 90 to a suitable source of water pressure, and having any suitable control valve (not shown), feeds the divergent hose-like branches 92, 94, which, as shown in Fig. 1, are brought up to the surface of the angle members 18, 20, and lie along the surfaces thereof parallel to the mandrel 40. Such hose members 92, 94 may be of any suitable collapsible material, such as fire-hose material, and may be maintained in desired operating position through the agency of suitable inverted continuous channel elements 96, 98, which are secured to the under portion of the rockers 70, 72, and positioned suitably intermediate the links 74 and the point of pivotal connection of said rockers with the angles 18, 20. Upon the introduction of suitable hydraulic pressure into the hose members 92, 94, the expansion thereof, operating against the resistance of the springs 78, urges the clamp heads 82 downwardly against the work 10, and clamps the work against the upper surface of the matrix bar 66.

The illustrated embodiment of the welding device is particularly adapted to the making of longitudinal, i. e., "body," seams in cylindrical structures, and may readily be adjustable to tanks of any diameter. Commercial sizes of tanks range from 12 inch to 22 or 24 inch tank diameter, usually in increments of 2 inches. Therefore, the end supports 14, 16 of my device are provided with a suitable plurality of spaced holes 98, and the cross members 22, 24 may be secured to the end frames at any desired spacing from the mandrel 40, through the agency of the illustrated bolts. Each pair of holes at the front and rear frame members should be in the same plane, and arranged to maintain the parallel relationship of member 42 and mandrel 40 at all locations.

The operator having decided upon the proper spacing between the clamp elements 82 in accordance with the thickness and/or configuration of the to-be-joined parts of the work and other limiting factors known to those skilled in the art, selects a matrix bar in which the matrix affords the desired depth of weld metal deposit 100, see Fig. 5, and desired area of bond of the weld metal with the underside of the joined surfaces. The gate 32 may be swung into its upward position and the work positioned over the matrix bar 66. At this stage, there is no hydraulic pressure in the hoses 92, 94, and the operation of the springs 78 has swung the clamps upwardly to afford adequate clearance. After moving the tank into position within the frame structure, the gate 32 may be dropped to engage and align the end of the mandrel 40, and upon the positioning of the side portions of the work in suitable relationship, hydraulic pressure serves to clamp the work securely against the matrix bar 66, the said hydraulic pressure acting uniformly upon all of said clamping means.

The work 10 may be supported at its bottom, and in the plane of the seam of the tank, by raising, as aforesaid, the wooden sill member 46 of the rail 44 into contact with the under side of the work. The support afforded by the sill 46 maintains the cylindrical characteristic of the work, and prevents spreading of its side-portions. Thus, the operator may complete his weld with full confidence that the uniformity of cylindrical structure will be maintained throughout.

Upon completion of the welding operation, release of hydraulic pressure enables the springs 78 to swing the clamps upwardly, and, if desired, a further movement of the lever 54 serves to raise the welded joint entirely clear of the matrix. Upon again raising the gate 32, the welded tank may be removed from the welding device, the sill 46 serving to support the tank throughout the length of its travel. Such sill serves to minimize the strain imposed on the mandrel 40, which, as stated, is in this circumstance supported only by the hanger 36 and the yoke 26.

The adjustable feature of the bottom supporting member 44 affords means whereby odd or intermediate sizes of structure may satisfactorily be accommodated.

In practice, it has been found that for a relatively broad range of thickness of the walls of the work, and for a broad range of tank diameters, the mandrel 40 and the matrix 68 may be of a single size, the upper surface of the matrix bar 66 being preferably curved on a suitable average radius. It is to be noted in this connection that the employment of the lower support rail 44 makes it necessary only for the tank edge portions to be in contact with the matrix bar because said bar is not called upon to support any substantial weight during the fabrication of the welded joint.

For simplification of description, the terms "weld" and "welding" have been employed. It is to be noted, however, that such methods of joining metallic surfaces as brazing, soldering, etc. may be accomplished with facility by my "welding" device.

Although possessing particular advantages in making butt "welds," lap welds may be made with my device, and it will be apparent that riveted seams may also be made, the matrix serving to establish the configuration of upset of the rivet material.

Whereas I have described my invention by reference to specific forms thereof it will be understood that many changes and modifications may be made without departing from the spirit of the invention.

I claim:

1. Apparatus for supporting blanks to be formed into a tubular structure by welding or like operations along a longitudinal seam, comprising, in combination, a frame open at an end portion, a mandrel fixedly supported within said frame and arranged to provide internal support for said blank throughout the length thereof, clamping means pivotally mounted on said frame on each side of said mandrel for rotation toward or away from said mandrel, said clamping means having heads arranged to urge the blank against the mandrel and disposed, when in clamping position, on opposite sides of the seam, expansible means operatively associated with said clamping means to rotate the same into clamping position, a rail coextensive with the blank positioned within said frame beneath said blank in parallelism therewith and in the vertical plane of the seam, means for raising or lowering said rail in the plane of such seam while maintaining the parallel relationship of said rail and said blank, and means for securing said rail in desired position.

2. Apparatus for supporting blanks to be formed into a tubular structure by welding or like operations along a longitudinal seam, comprising, in combination, a frame open at an end portion, a mandrel fixedly supported within said frame and arranged to provide internal support for said blank throughout the length thereof, clamping means pivotally mounted on said frame on each side of said mandrel for rotation toward or away from said mandrel, said clamping means having heads arranged to urge the blank against the mandrel and disposed, when in clamping position, on opposite sides of the seam, expansible means operatively associated with said clamping means to rotate the same into clamping position, a rail coextensive with the blank positioned within said frame beneath said blank in parallelism therewith and in the vertical plane of the seam, means for raising or lowering said rail in the plane of such seam while maintaining the parallel relationship of said rail and said blank, and means for securing said rail in desired position, said rail and its said operating means being adjustably mounted within said frame for variant vertical positioning with respect to said mandrel.

EDWARD S. CORNELL, JR.